United States Patent [19]

Pfoehler et al.

[11] Patent Number: 4,912,147

[45] Date of Patent: Mar. 27, 1990

[54] PREPARATION OF AQUEOUS (METH)ACRYLATE COPOLYMER DISPERSIONS IN TWO STAGES AND THEIR USE AS IMPREGNATING MATERIALS, COATING MATERIALS AND BINDERS FOR SHEET-LIKE FIBROUS STRUCTURES

[75] Inventors: Peter Pfoehler, Speyer; Maximilian Angel, Mutterstadt; Andreas Einwiller, Mannheim; Klaus Schagerer, Gruenstadt, all of Fed. Rep. of Germany

[73] Assignee: BASF Aktiengesellschaft, Ludwigshafen, Fed. Rep. of Germany

[21] Appl. No.: 257,877

[22] Filed: Oct. 14, 1988

[30] Foreign Application Priority Data

Oct. 14, 1987 [DE] Fed. Rep. of Germany ..... 37347527

[51] Int. Cl.$^4$ ................................................. C08K 3/20
[52] U.S. Cl. ..................................... 524/460; 524/458
[58] Field of Search ................................ 524/460, 458

[56] References Cited

U.S. PATENT DOCUMENTS

| | | | |
|---|---|---|---|
| 3,137,589 | 6/1964 | Reinhard et al. | 427/389 |
| 4,002,801 | 1/1977 | Knechtges et al. | 428/474 |
| 4,107,120 | 8/1978 | Plamondon et al. | 523/201 |
| 4,181,769 | 1/1980 | Plamondon et al. | 428/253 |
| 4,289,676 | 9/1981 | Czauderna et al. | 526/304 X |
| 4,299,748 | 11/1981 | Hashizume et al. | 428/500 X |
| 4,689,264 | 8/1987 | Fink et al. | 428/290 |

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

Aqueous (meth)acrylate copolymer dispersions can be prepared by polymerization of the monomers in two stages having different monomer compositions and with the concomitant use of crosslinking monomers in aqueous emulsion at the usual temperatures in the presence of the conventional emulsifiers and polymerization initiators, from 40 to 99.5% by weight of the total monomers being polymerized in the first stage and from 60 to 0.5% by weight of the total monomers being polymerized in the second stage, by a process in which from 0.5 to 10% by weight, based on the total monomers, of (meth)-acrylamidoglycollic acid and /or its methyl ester and/or its methyl ether are polymerized in the second stage and from 0 to 1.8% by weight, based on the total monomers, of the amidoglycollic acid compounds are polymerized in the first stage, and the resulting copolymer dispersions are used as binders for sheet-like textile fibrous structures.

2 Claims, No Drawings

PREPARATION OF AQUEOUS (METH)ACRYLATE COPOLYMER DISPERSIONS IN TWO STAGES AND THEIR USE AS IMPREGNATING MATERIALS, COATING MATERIALS AND BINDERS FOR SHEET-LIKE FIBROUS STRUCTURES

In order to impart to sheet-like textile structures good wet strength and resistance to cleaning agents, it is usual to bind the sheet-like structure with polymer dispersions which contain self-crosslinking groups, e.g. N-methylolamide groups (cf. for example U.S. Pat. Nos. 3,137,589 and 4,002,801 and German Laid-Open Application DOS No. 2,726,806). As a result, however, the sheet-like textile structure bound by the crosslinked binder loses its hot sealability, for example with itself or with other substrates, for example of PVC. The combination sealability on the one hand and wet strength on the other would, however, be of interest for the hygiene fleece sector, for example for babies' diapers, but also in other areas where it is important to have an adhesive-free bond between sheet-like textile structures, with or without other substrates, which must have sufficient wet strength, for example milk filters. Preferred binders are those which do not eliminate any formaldehyde during crosslinking. German Laid-Open Application DOS No. 2,855,147 discloses hot-sealable, antistatic coating materials based on aqueous copolymer dispersions which contain, as copolymerized electrically conductive vinyl monomers, olefinically unsaturated quaternary ammonium salts or olefinically unsaturated sulfonic acids. The coating materials contain, in particular, copolymerized acrylyl comonomers as the principal monomers. To impart hot-sealing properties, the coating materials should be applied to films, in particular those based on polyolefins, polystyrene, polyvinyl chloride or polyamides. German Laid-Open Application DOS No. 2,855,147 gives no indication of the extent to which such copolymer dispersions may be suitable as binders for strengthening fleeces. Furthermore, German Patent No. 2,725,586 discloses aqueous coating materials based on dispersions of vinylidene chloride copolymers having a shell-like structure, the said dispersions containing small amounts of acrylic ester as well as acrylic acid and N-methylolacrylamide as copolymerized units, being used for coating films, for example of polyolefins, polyethylene terephthalate or polycarbonates and being intended to give products which have a relatively low sealing temperature, good hot-sealing properties and furthermore good slip and antiblocking properties. Owing to their hardness, such copolymer dispersions are not suitable as binders for sheet-like textile structures, and German Patent No. 2,725,586 gives no indication at all of such a use. In these known copolymer dispersions, the good sealing strength is said to be attributable exclusively to the use of the specific adhesion promoter, an unsaturated carboxamide/N-methylol derivative. Without the specific adhesion promoter, the sealing strengths under comparable conditions were insufficient. European Patent No. 0,019,169 discloses binders for fleeces based on butadiene copolymer dispersions or on polyacrylate dispersions, each of which contains copolymerized acrylamidoglycollic acid in amounts of from 3 to 10% by weight, based on the total monomers. The fleeces bound therewith have particularly high resistance to washing and dry cleaning, particularly when they additionally contain N-methylolacrylamide as copolymerized units. German Laid-Open Application DOS No. 3,507,154 relates to a process for the production of sheet-like textile structures using polyacrylates which contain from 1 to 10% by weight of a (meth)acrylamidoglycollic ester ether as copolymerized units. The binders result in wet strength, water resistance and wash liquor resistance which are sufficient for practical purposes and do not release any formaldehyde on heating. If strengthened fibrous structures which are resistant to organic solvents are desired, a crosslinking agent, for example glyoxal, must be added.

It is an object of the present invention to provide a process for the preparation of copolymer dispersions which are particularly suitable for binding sheet-like textile structures, such as fleeces, and give products which have high wet strength and embossibility and/or hot-sealing properties sufficient for practical purposes and furthermore do not release any formaldehyde on heating and possess a soft hand.

We have found that this object is achieved and that aqueous (meth)acrylate copolymer dispersions can be advantageously prepared by polymerization of the monomers in two stages having different monomer compositions and with the concomitant use of crosslinking monomers in aqueous emulsion at the usual temperatures in the presence of conventional emulsifiers and polymerization initiators, from 40 to 99.5% by weight of the total monomers being polymerized in the first stage and from 60 to 0.5% by weight of the total monomers being polymerized in the second stage, by a method in which, from 0.5 to 10% by weight, based on the total monomers, of (meth)acrylamidoglycollic acid and/or its methyl ester and/or its methyl ether are polymerized in the second stage and from 0 to 1.8% by weight, based on the total monomers, of these amidoglycollic acid compounds are polymerized in the first stage. In the novel process, (a) from 85 to 99.5% by weight of $\alpha,\beta$-monoolefinically unsaturated carboxylic esters of 3 to 12 carbon atoms (b) from 0.5 to 10% by weight of (meth)acrylamidoglycollic acid and/or its methyl ester and/or its methyl ether and (c) from 0 to 5% by weight of $\alpha,\beta$-monoolefinically unsaturated carboxylic acids of 3 to 5 carbon atoms and/or their amides are preferably used in both stages together, the monomers (a) used comprising only up to 35% by weight of vinyl monocarboxylates, some or all of which can be replaced by acrylonitrile and/or styrene, the type and amount of components being chosen so that the glass transition temperature of the resulting copolymers is below 60° C.

The main monomers used in the novel process are acrylates and/or methacrylates of alkanols of 1 to 8 carbon atoms, e.g. methyl acrylate, ethyl acrylate, isopropyl acrylate, n-butyl acrylate and methacrylate, isobutyl acrylate and methacrylate, n-hexyl acrylate and methacrylate and 2-ethylhexyl acrylate and methacrylate. Particularly suitable vinyl monocarboxylates are vinyl acetate and vinyl propionate, and dimethyl laurate and vinyl versatate are also suitable. The amount of copolymerized acrylamidoglycollic acid, methacrylamidoglycollic acid and/or their methyl esters and their methyl ethers, which act as crosslinking agents, is in general from 0.5 to 10, preferably from 1.5 to 6, % by weight, based on the total monomers (of the first and second stages). Preferably, the amidoglycollic acid compound of the stated type is used exclusively in the second polymerization stage.

Small amounts, i.e. from 0 to 0.2% by weight, of further crosslinking comonomers, such as divinylbenzene, allyl methacrylate or butanediol diacrylate, can additionally be used as crosslinking comonomers in the novel process, in particular in the first polymerization stage, with the result that the mechanical strength of the substrates strengthened with the dispersions can be increased.

In the novel copolymerization, from 0 to 8, in particular from 0 to 5, % by weight, based on the total monomers, of monoolefinically unsaturated mono- and/or dicarboxylic acids of 3 to 5 carbon atoms and/or their amides, in particular acrylic acid, methacrylic acid, acrylamide and methacrylamide, as well as maleic acid, itaconic acid, fumaric acid, maleic acid monoamide and diamide, maleimide and fumaric acid diamide, can also be copolymerized. In general, a polymer composition whose glass transition temperature should preferably be below 60° C., in particular below 20° C., is desirable in the process.

The novel emulsion polymerization is carried out in two stages using the conventional emulsifiers and polymerization initiators, from 40 to 99.5, preferably from 60 to 98.5, % by weight of the total monomers being polymerized in the first stage and from 60 to 0.5, preferably from 40 to 1.5, % by weight of the total monomers being polymerized in the second stage. The emulsion polymerization is generally carried out by the monomer or emulsion feed process, at from 30° to 100° C., in particular from 50° to 95° C.

The monomer feed of the second stage generally takes place after the end of the monomer feed of the first stage, although there may also be a slight overlap of the monomer feeds, which may be up to about 35%.

Particularly suitable polymerization initiators are water-soluble peroxides, such as potassium persulfate, hydrogen peroxide, peroxocarbonates, sodium peroxydisulfate and ammonium peroxodisulfate. Polymerization initiators of particular interest are redox catalysts, i.e. systems consisting of an oxidizing agent and a reducing agent. Examples of suitable oxidizing components are hydrogen peroxide, potassium persulfate, peroxocarbonates, sodium peroxodisulfate and ammonium peroxodisulfate; examples of suitable reducing components are ascorbic acid, alkali metal disulfites, alkali metal or ammonium bisulfites, alkali metal thiosulfates, alkali metal dithionites and iron(II) sulfate.

In general, from 0.1 to 2% by weight of the polymerization initiators are used in the first stage and from 0.1 to 1% by weight in the second stage.

Preferred emulsifiers in the novel emulsion polymerization process are anionic emulsifiers, in particular sulfated alkylphenol ethoxylates, alkylaryl sulfonates, alkyl sulfates and alkyl ether sulfates, the amount of these preferably being from 0.5 to 3, in particular from 1 to 2, % by weight, based on the monomers. The amount of polymerization initiators is in general from 0.1 to 2, in particular from 0.2 to 0.8, % by weight, based on the total monomers. In addition to the anionic emulsifiers, nonionic emulsifiers, for example alkoxylated alkylphenols having from 25 to 50 ethylene oxide and/or propylene oxide radicals, can also be used, and the amount of these can be in general up to 100% by weight, based on the anionic emulsifiers.

The aqueous copolymer dispersions prepared by the novel process should in general have a copolymer content of from 35 to 65, in particular from 40 to 55, % by weight. They are particularly suitable as binders for sheet-like textile structures, to which they impart hot sealing properties coupled with good wet strength and a soft handle. When they are used for binding sheet-like textile substrates, pigments, antioxidants, dyes, plasticizers and film-forming assistants may also be used in the usual amounts. They can advantageously be used as binders for fleeces of the conventional natural and/or synthetic fibers, for example of wool, cotton, viscose, polyamides, polyesters or polypropylene. They are also suitable for impregnating woven and nonwoven sheet-like textile structures and make the bound textile embossible and hot-sealable. When the aqueous copolymer dispersions prepared by the novel process are used, conventional antifoams, wetting agents, heat sensitizers, antistatic agents, flameproofing agents, bactericides and fillers can also be used. When used as binders for fleeces, the dispersions can be applied in a conventional manner by impregnation, foam impregnation, spraying, padding, spreading or printing. After the excess binder has been removed, for example by squeezing out, the impregnated fleece can be dried and then heated, for which temperatures of from 110° to 200° C., preferably from 120° to 170° C., can be used. Good results were obtained when the binder content of strengthened fleeces was from 10 to 50% by weight, based on the fiber weight.

In comparison with conventionally bound fleeces, the bound fleeces prepared according to the invention have a combination of very good wet strength and very good hot-sealing properties. This is particularly important if the textile fleece is subjected to mechanical stress in the wet state during production, further processing or use and is also to be sealed.

A typical application is the production of disposable diapers. The fleeces bound according to the invention form the outer envelope of the diaper, surrounding an absorbent filling material. The enveloping synthetic fibers fleece has a comparatively dry surface, even when the filling material has absorbed considerable amounts of liquid. Under mechanical load, the outer enveloping fleece does not tear in practice, and release of the wet filling material is prevented. Of equally great importance with regard to the use of the diaper is of course also the seam strength, which indicates the mechanical load which the parts sealed together withstand before the seam parts.

In the Examples which follow, parts and percentages are by weight.

EXAMPLE 1

An emulsion consisting of 303 parts of water, 368 parts of ethyl acrylate, 108 parts of methyl acrylate, 8.6 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of 2 hours. After the end of the addition, a second emulsion consisting of 252 parts of water, 108 parts of ethyl acrylate, 61 parts of methyl acrylate, 30.5 parts of acrylamidoglycollic acid, 1.5 parts of an adduct of isooctylphenol and 25 moles of ethylene oxide, 1.5 parts of a sulfated

EXAMPLE 2

An emulsion consisting of 303 parts of water, 392 parts of ethyl acrylate, 85 parts of vinyl acetate, 8.6 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of 2 hours. After the end of the addition, a second emulsion consisting of 252 parts of water, 85 parts of ethyl acrylate, 85 parts of vinyl acetate, 30.5 parts of acrylamidoglycollic acid, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is run in over one hour.

Thereafter, polymerization is continued for a further 2 hours at 60° C. A stable coagulator-free dispersion having a solids content of 45% is obtained.

EXAMPLE 3

An emulsion consisting of 303 parts of water, 392 parts of ethyl acrylate, 85 parts of methyl methacrylate, 8.6 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of hours. After the end of the addition, a second emulsion consisting of 252 parts of water, 85 parts of ethyl acrylate, 85 parts of methyl methacrylate, 30.5 parts of acrylamidoglycollic acid, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is run in over one hour.

Thereafter, polymerization is continued for a further two hours at 60° C. A stable coagulate-free dispersion having a solids content of 45% is obtained.

EXAMPLE 4

An emulsion consisting of 314 parts of water, 368 parts of ethyl acrylate, 108 parts of methyl acrylate, 6.75 parts of an adduct of isooctylphenol and 25 moles of ethylene oxide, 6.75 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of 2 hours. After the end of the addition, a second emulsion consisting of 242 parts of water, 122 parts of ethyl acrylate, 61 parts of methyl methacrylate, 17.0 parts of methacrylamidoglycollic acid, 3.4 parts of an adduct of isooctylphenol and 25 moles of ethylene oxide, 3.4 parts of a sulfated adduct of isooctylphenol and 25 moles of ethylene oxide and 0.4 part of ascorbic acid is run in over one hour.

Thereafter, polymerization is continued for a further two hours at 60° C. A stable coagulate-free dispersion having a solids content of 45% is obtained.

EXAMPLE 5

An emulsion consisting of 303 parts of water, 368 parts of ethyl acrylate, 108 parts of methyl acrylate, 8.6 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of 2 hours. After the end of the addition, a second emulsion consisting of 252 parts of water, 116 parts of methyl acrylate, 66 parts of n-butyl acrylate, 17 parts of acrylamidoglycollic acid, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is run in over one hour.

Thereafter, polymerization is continued for a further two hours at 60° C. A stable coagulate-free dispersion having a solids content of 45% is obtained.

EXAMPLE 6

An emulsion consisting of 303 parts of water, 412 parts of ethyl acrylate, 212 parts of methyl acrylate, 40 parts of n-butyl acrylate, 8.6 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 208 parts of water at 60° C. in the course of 2 hours. After the end of the addition, a second monomer mixture consisting of 252 parts of water, 10 parts of acrylamidoglycollic acid, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is fed in over one hour.

Thereafter, polymerization is continued for a further two hours at 60° C. A stable coagulate-free dispersion having a solids content of 45% is obtained.

EXAMPLE 7

The procedure is similar to that described in Example 6, except that the second monomer mixture contains 17 parts of acrylamidoglycollic acid.

A stable coagulate-free dispersion having a solids content of 45% is obtained.

EXAMPLE 8

The procedure is similar to that described in Example 6. In the first stage, 283 parts of water (instead of 303 parts) are used. The second monomer mixture contains 24 parts of acrylamidoglycollic acid and 272 parts of water.

A stable coagulate-free dispersion having a solids content of 45% is obtained.

EXAMPLE 9

An emulsion consisting of 303 parts of water, 476 parts of ethyl acrylate, 169 parts of methyl acrylate, 8.6 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 208 parts of water at 60° C. in the course of two hours. After the end of the addition, a second monomer mixture consisting of 252 parts of water, 31 parts of acrylamidoglycollic acid, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is fed in over one hour.

Thereafter, polymerization is continued for a further two hours at 60° C. A stable coagulate-free dispersion having a solids content of 45% is obtained.

EXAMPLE 10

An emulsion consisting of 283 parts of water, 652 parts of ethyl acrylate, 8.6 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 208 parts of water at 60° C. in the course of 2 hours. After the end of the addition, a second monomer mixture consisting of 272 parts of water, 24 parts of acrylamidoglycollic acid, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is fed in over one hour.

Thereafter, polymerization is continued for a further two hours at 60° C. A stable coagulate-free dispersion having a solids content of 45% is obtained.

EXAMPLE 11

The procedure is initially carried out as described in Example 3. After the end of feed 1, however, a second emulsion consisting of 252 parts of water, 105 parts of ethyl acrylate, 84 parts of methyl methacrylate and 10 parts of acrylamidoglycollic acid, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is fed in over one hour.

Thereafter, polymerization is continued for a further 2 hours at 60° C. A stable coagulate-free dispersion having a solids content of 45% is obtained.

EXAMPLE 12

An emulsion consisting of 303 parts of water, 368 parts of ethyl acrylate, 108 parts of methyl acrylate, 8.6 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of hours. After the end of the addition, a second emulsion consisting of 252 parts of water, 108 parts of ethyl acrylate, 61 parts of vinyl propionate, 31 parts of acrylamidoglycollic acid, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is run in over one hour.

Thereafter, polymerization is continued for a further two hours at 60° C. A stable coagulate-free dispersion having a solids content of 45% is obtained.

EXAMPLE 13

An emulsion consisting of 202 parts of water, 385 parts of ethyl acrylate, 85 parts of vinyl acetate, 7 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of 2 hours. After the end of the addition, a second emulsion consisting of 350 parts of water, 85 parts of vinyl acetate, 61 parts of ethyl acrylate, 41 parts of acrylamidoglycollic acid, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is fed in over one hour.

Thereafter, polymerization is continued for a further two hours at 60° C. A stable coagulate-free dispersion having a solids content of 45% is obtained.

EXAMPLE 14

The procedure is similar to that described in Example 2, except that the addition of the second stage is begun when 70% of the first stage have been fed in. The feed rates of the individual stages are retained (overlapping stages).

A stable coagulate-free dispersion having a solids content of 45% is obtained.

EXAMPLE 15

The procedure is similar to that described in Example 2, except that the addition of the second stage is begun in the course of the first stage, when 70% of the first stage have been fed in. The feed rates are retained (stepwise procedure combined with gradient procedure).

A stable coagulate-free dispersion having a solids content of 45% is obtained.

COMPARATIVE EXPERIMENTS (A) An emulsion consisting of 555 parts of water, 476 parts of ethyl acrylate, 169 parts of methyl acrylate, 10.1 parts of an adduct of isooctylphenol and 25 moles of ethylene oxide, 10.1 parts of a sulfated adduct of isooctylphenol and 25 moles of ethylene oxide and 1.35 parts of ascorbic acid and 30.5 parts of acrylamidoglycollic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of 3 hours. Thereafter, polymerization is continued for a further 2 hours at 60° C. A stable coagulate-free dispersion having a solids content of 45% is obtained.

(B) An emulsion consisting of 555 parts of water, 476 parts of ethyl acrylate, 169 parts of vinyl acetate, 10.1 parts of an adduct of isooctylphenol and 25 moles of ethylene oxide, 10.1 parts of a sulfated adduct of isooctylphenol and 25 moles of ethylene oxide and 1.35 parts of ascorbic acid and 30.5 parts of acrylamidoglycollic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of 3 hours. Thereafter, polymerization is continued for a further 2 hours at 60° C. A stable coagulate-free dispersion having a solids content of 45% is obtained.

(C) The procedure is similar to that described in Example 3, except that polymerization is carried out in one stage as in Example A.

The dispersion obtained by the single-stage procedure is unstable.

(D) The procedure is similar to that described in Example 1, except that, instead of the 30.5 parts of acrylamidoglycollic acid, a mixture of 21 parts of N-methylolmethacrylamide and 6 parts of acrylamide is used as the crosslinking monomer. Under otherwise identical conditions, a stable, coagulate-free dispersion having a solids content of 45% is obtained.

(E) The procedure is similar to that described in Example 1, except that a mixture of 15 parts of methacrylic acid and 12 parts of acrylamide is used instead of the 30.5 parts of acrylamidoglycollic acid. A stable, coagulate-free dispersion having a solids content of 45% is obtained.

(F) An emulsion consisting of 314 parts of water, 368 parts of ethyl acrylate, 108 parts of methyl acrylate, 6.75 parts of an adduct of isooctylphenol and 25 moles of ethylene oxide, 6.75 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of 2 hours. After the end of the addition, a second emulsion consisting of 231 parts of water, 122 parts of ethyl acrylate, 68 parts of methyl acrylate, 10.5 parts of N-methylolacrylamide, 3.4 parts of an adduct of isooctylphenol and 25 moles of ethylene oxide, 3.4 parts of a sulfated adduct of isooctylphenol and 25 moles of ethylene oxide and 0.4 part of ascorbic acid is run in over one hour.

Thereafter, polymerization is continued for a further two hours at 60° C. A stable coagulate-free dispersion having a solids content of 45% is obtained.

(G) An emulsion consisting of 303 parts of water, 351 parts of ethyl acrylate, 108 parts of methyl acrylate, 17 parts of acrylamidoglycollic acid, 8.6 parts of an adduct of isooctylphenol and 25 moles of ethylene oxide, 8.6 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 211 parts of water at 60° C. in the course of 2 hours. After the end of the addition, a second emulsion consisting of 252 parts of water, 125 parts of methyl acrylate, 74 parts of n-butyl acrylate, 1.5 parts of an adduct of isooctylphenol and 25 moles of ethylene oxide, 1.5 parts of a sulfated adduct of isooctylphenol and 25 moles of ethylene oxide and 0.4 part of ascorbic acid is run in over one hour.

Thereafter, polymerization is continued for a further 2 hours at 60° C. A stable coagulate-free dispersion having a solids content of 45% is obtained.

(H) An emulsion consisting of 365 parts of ethyl acrylate, 108 parts of methyl acrylate, 3.5 parts of Nmethylolacrylamide, 6.7 parts of an adduct of isooctylphenol and 25 moles of ethylene oxide, 6.7 parts of a sulfated adduct of isooctylphenol and 25 moles of ethylene oxide and 0.95 part of ascorbic acid is added to a solution of 4.5 parts of a 30% strength aqueous solution of hydrogen peroxide, 0.0135 part of ascorbic acid and 0.001 part of iron(II) sulfate in 201 parts of water at 60° C. in the course of 2 hours. After the end of the addition, a second emulsion consisting of 247 parts of water, 122 parts of ethyl acrylate, 61 parts of methyl acrylate, 17 parts of acrylamidoglycollic acid, 3.4 parts of an adduct of isooctylphenol and 25 moles of ethylene oxide, 3.4 parts of a sulfated adduct of isooctylphenol and 25 moles of ethylene oxide and 0.4 part of ascorbic acid is fed in over one hour.

Thereafter, polymerization is continued for a further 2 hours at 60° C. A stable coagulate-free dispersion having a solids content of 45% is obtained.

(I) An emulsion consisting of 553 parts of water, 422 parts of ethyl acrylate, 213 parts of methyl acrylate, 41 parts of n-butyl acrylate, 10.1 parts of an adduct of isooctylphenol and 25 moles of ethylene oxide, 10.1 parts of a sulfated adduct of isooctylphenol and 25 moles of ethylene oxide and 1.35 parts of ascorbic acid is added to a solution of 4.5 parts of a 30% strength aqueous solution of hydrogen peroxide, 0.0135 part of ascorbic acid and 0.001 part of iron(II) sulfate in 208 parts of water at 60° C. in the course of 3 hours.

Thereafter, polymerization is continued for a further 2 hours at 60° C. A stable coagulate-free dispersion having a solids content of 45% is obtained.

(K) The procedure followed is similar to that described in Example 12, except that polymerization is carried out in one stage as in Example A. A stable coagulate-free dispersion having a solids content of 45% is obtained.

(L) The procedure is similar to that described in Example 10, except that polymerization is carried out in one stage as in Example A. A stable coagulate-free dispersion having a solids content of 45% is obtained.

Investigations into bound fleeces

I A fleece of 100% polyester fiber (3.3 dtex/60 mm staple length) is impregnated with the binders of the Examples and Comparative Experiments in a fiber-/binder ratio of 2:1, the excess binder is squeezed out between two rollers and the impregnated substrate is dried for 4 minutes at 150° C. and heated. The final weight per unit area is 50 g/m$^2$. The results of the strip tensile test (DIN 53,857, sheet 2) and the results of the tensile tests after hot sealing (sealing conditions: 2 seconds, 170° C., 6 bar, sealing area 5 cm$^2$, lower surface of the fleece sealed with the upper surface) are summarized in the Tables below.

TABLE 1

| Strip tensile test (N/50 mm strip width) | | | | | |
|---|---|---|---|---|---|
| Polymer of Example | 1 | 2 | 3 | 4 | 5 |
| Maximum tensile force (dry) | 83 | 82 | 98 | 91 | 93 |
| Maximum tensile force (water-wet) | 58 | 43 | 63 | 25 | 33 |
| Maximum tensile force (after sealing) | 12.4 | 17.6 | 9.9 | 10.1 | 11.4 |

TABLE 2

| Strip tensile test (N/50 mm strip width) | | | | | | |
|---|---|---|---|---|---|---|
| Polymer of Comparative Experiment | A | B | D | E | F | G |
| Maximum tensile force (dry) | 73 | 82 | 112 | 100 | 79 | 80 |
| Maximum tensile force (water-wet) | 39 | 41 | 51 | 7 | 10 | 29 |
| Maximum tensile force (after sealing) | 1.3 | 1.9 | 0 | 22 | 15.1 | 1.1 |

TABLE

Polyester fleece

Strip tensile test Polymer of Example (Values in N/50 mm strip width)

| Polymer of Example | 6 | 7 | 8 | 9 | 10 | 11 | 12 |
|---|---|---|---|---|---|---|---|
| Maximum tensile force (dry) | 89 | 103 | 121 | 97 | 55 | 112 | 73 |
| Maximum tensile force (water-wet) | 41 | 46 | 55 | 36 | 65 | 49 | 43 |
| Maximum tensile force (after sealing) | 17.0 | 10.1 | 18.2 | 16.4 | 26.1 | 14.1 | 13.2 |

| Polymer of Example or Comparative Experiment | 13 | 14 | 15 | H | I | K | L |
|---|---|---|---|---|---|---|---|
| Maximum tensile force (dry) | 91 | 121 | 131 | 103 | 65 | 68 | 101 |
| Maximum tensile force (water-wet) | 55 | 66 | 73 | 63 | 10.7 | 40 | 62 |
| Maximum tensile force (after sealing) | 14.9 | 13.1 | 12.5 | 0 | 21.2 | 2.0 | 0 |

II A fleece consisting of viscous fibers (2.8 dtex/40 mm staple Length) is impregnated with the binders of the Examples and Comparative Experiments in a fiber/binder ratio of 2:1, the excess binder is squeezed out between two rollers and the impregnated substrate is dried for 4 minutes at 150° C. and condensed. The final weight per unit area is 50 g/m². The results are summarized in the Tables below.

TABLE 3

Strip tensile test (N/50 mm strip length)

| Polymer of Example | 1 | 2 | 3 | 4 | 5 |
|---|---|---|---|---|---|
| Maximum tensile force (dry) | 70 | 73 | 81 | 110 | 99 |
| Maximum tensile force (water-wet) | 34 | 31 | 36 | 40 | 44 |
| Maximum tensile force (after sealing) | 6.3 | 8.1 | 4.4 | 10.1 | 8.5 |

TABLE 4

Strip tensile test (N/50 mm strip width)

| Polymer of Comparative Experiments | A | B | D | E | F | G |
|---|---|---|---|---|---|---|
| Maximum tensile force (dry) | 79 | 73 | 106 | 102 | 88 | 111 |
| Maximum tensile force (water-wet) | 34 | 35 | 39 | 12 | 19 | 40 |
| Maximum tensile force (after sealing) | 0 | 1.2 | 0 | 16 | 9.5 | 1.4 |

TABLE

Viscose fleece

Strip tensile test Polymer of Example (Values in N/50 mm strip width)

| Polymer of Example | 6 | 7 | 8 | 9 | 10 | 11 | 12 |
|---|---|---|---|---|---|---|---|
| Maximum tensile force (dry) | 82 | 116 | 91 | 104 | 69.5 | 90 | 68 |
| Maximum tensile force (water-wet) | 39 | 41 | 39 | 42 | 37.5 | 41 | 34 |
| Maximum tensile force (after sealing) | 12.8 | 10.9 | 8.9 | 7.7 | 7.6 | 16.8 | 6.5 |

| Polymer of Example or Comparative Experiment | 13 | 14 | 15 | H | I | K | L |
|---|---|---|---|---|---|---|---|
| Maximum tensile force (dry) | 96 | 100 | 100 | 85 | 77 | 74 | 92 |
| Maximum tensile force (water-wet) | 43 | 45 | 43 | 44 | 17 | 35 | 42 |
| Maximum tensile force (after sealing) | 11.6 | 11.1 | 8.1 | 0 | 13.2 | 1.0 | 0 |

We claim:

1. A process for the preparation of an aqueous (meth)acrylate copolymer dispersion by polymerization of the monomers in two stages having different monomer compositions and with the concomitant use of crosslinking monomers in aqueous emulsion at 30° to 100° C. in the presence of a conventional emulsifier and polymerization initiator, from 40 to 99.5% by weight of the total monomers being polymerized in the first stage and from 60 to 0.5% by weight of the total monomers being polymerized in the second stage, wherein from 0.5 to 10% by weight, based on the total monomers, of (meth)acrylamidoglycollic acid, its methyl ester, its methyl ether or mixtures thereof are polymerized in the second stage and from 0 to 1.8% by weight, based on the total monomers, of these amidoglycollic acid compounds are polymerized in the first stage.

2. A process as claimed in claim 1, wherein
   (a) from 85 to 99.5% by weight of α,β-monoolefinically unsaturated carboxylic esters of 3 to 12 carbon atoms and
   (b) from 0.5 to 10% by weight of (meth)acrylamidoglycollic acid its methyl ester, its methyl ether or mixtures thereof and
   (c) from 0 to 5% by weight of α,β-monoolefinically unsaturated carboxylic acids of 3 to 5 carbon atoms their amides or mixtures thereof
   are used as monomers in both stages together, the monomers (a) used comprising only up to 35% by weight of vinyl monocarboxylates, some or all of which can be replaced by acrylonitrile styrene or mixtures thereof, so that the glass transition temperature of the resulting copolymer is below 60° C.

* * * * *